Feb. 28, 1933.   A. L. NELSON ET AL   1,899,585
ADJUSTABLE SEAT CONSTRUCTION
Filed Oct. 26, 1931   2 Sheets-Sheet 1
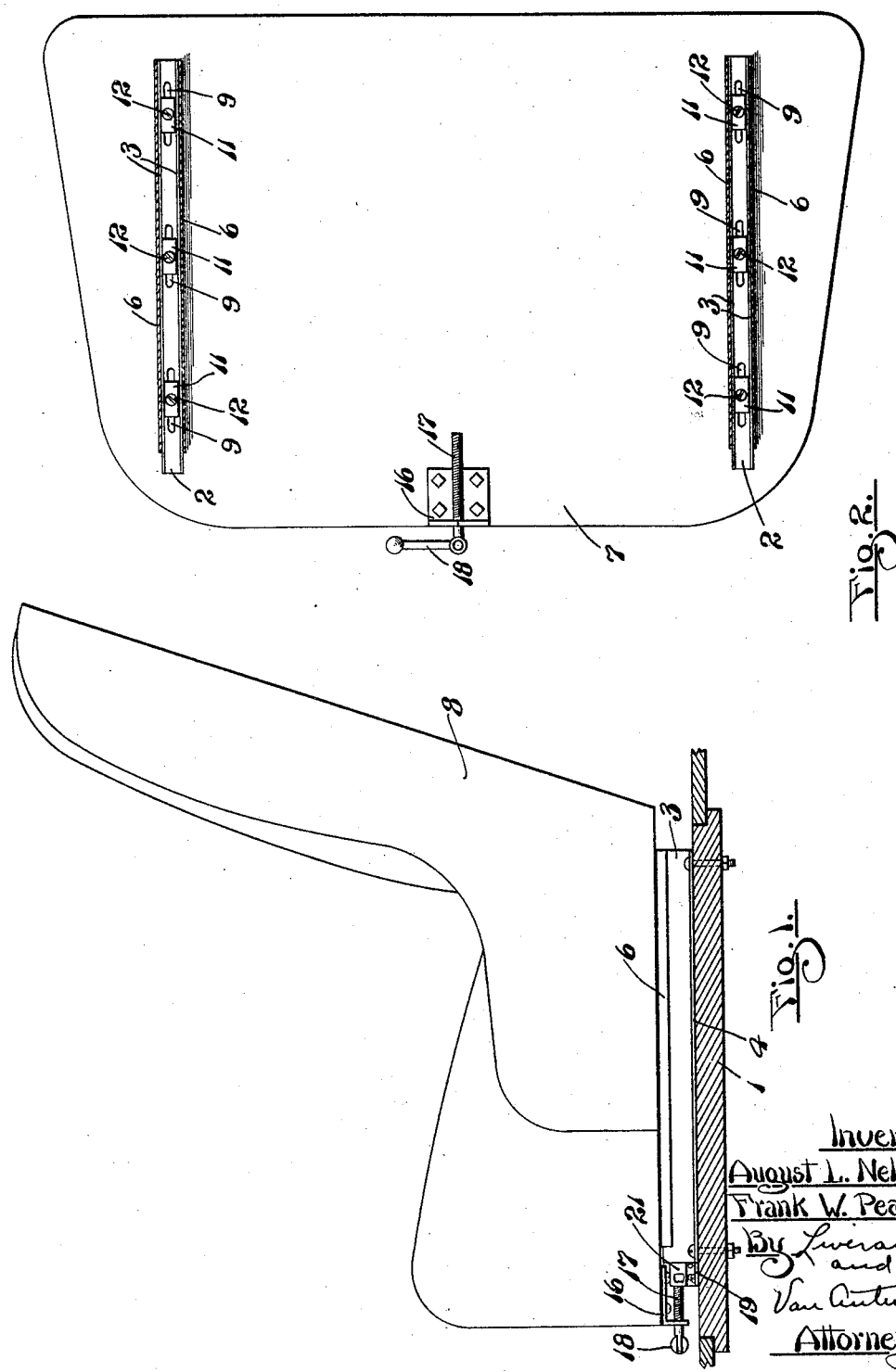

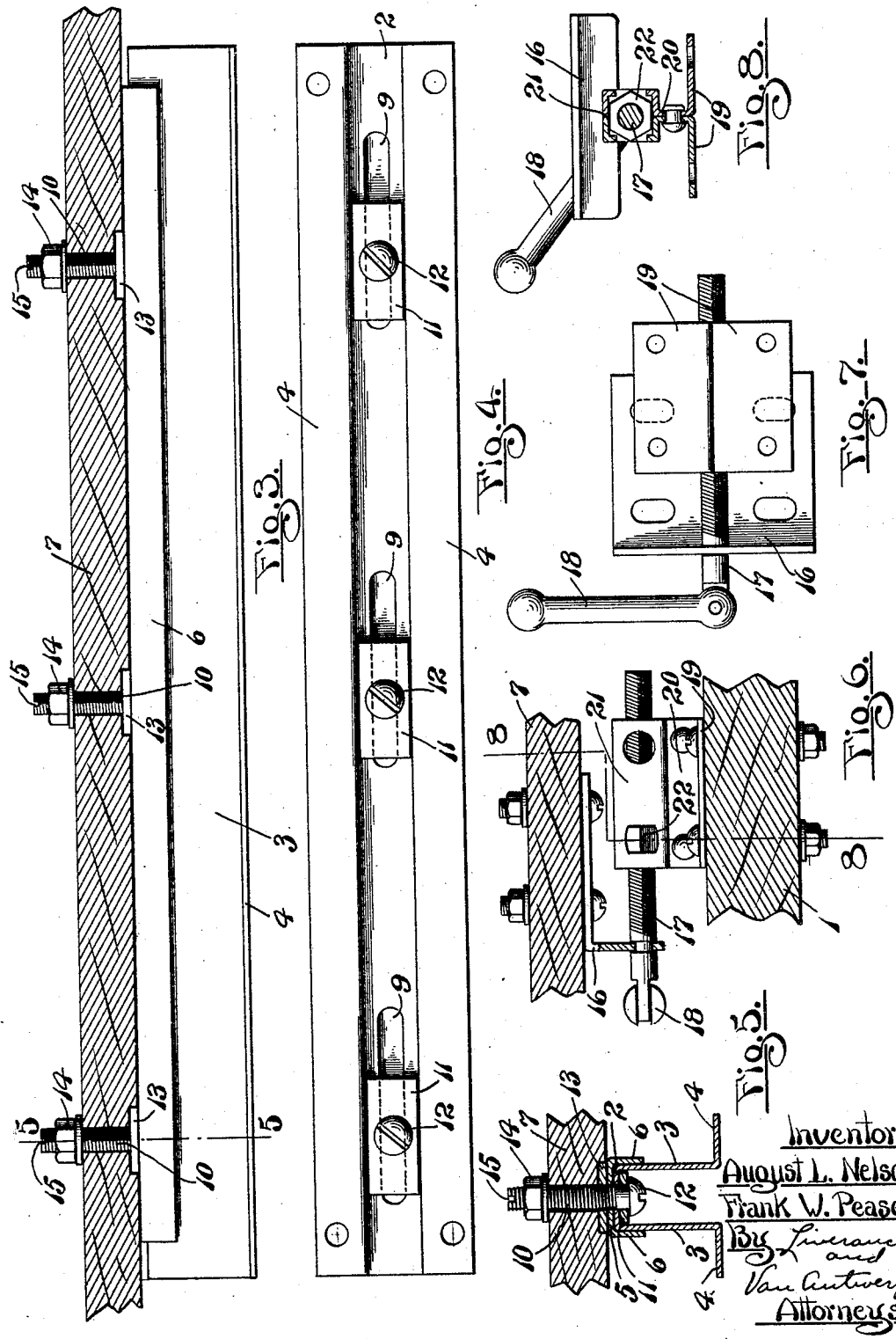

Patented Feb. 28, 1933

1,899,585

UNITED STATES PATENT OFFICE

AUGUST L. NELSON AND FRANK W. PEASE, OF GRAND RAPIDS, MICHIGAN, ASSIGNORS TO HAYES BODY CORPORATION, OF GRAND RAPIDS, MICHIGAN, A CORPORATION OF MICHIGAN

ADJUSTABLE SEAT CONSTRUCTION

Application filed October 26, 1931. Serial No. 571,014.

This invention relates to an adjustable seat construction, particularly useful in conjunction with the driver's seat in an automobile which should have a certain range of from front to rear adjustment, to accommodate the different sizes of drivers who will occupy the seats in different automobiles.

It is a primary object and purpose of the present invention to provide a construction for adjustably mounting said driver's seat and for readily and easily shifting the same to different places, and at the same time provide a construction which is strong and durable, simple to manufacture and one in which binding between the seat and the tracks on which it is adjusted may be obviated and elimination of rattles or undesirable noises obtained, with provisions for adjusting the connection between the driver's seat and the tracks on which the same move as tight or as loose as may be desired, all accomplished in a very simple and economical manner.

An understanding of the invention may be had from the following description, taken in connection with the accompanying drawings, in which, Fig. 1 is a side elevation of an automobile driver's seat having the adjustable mounting of our invention.

Fig. 2 is an under plan view thereof partly in section.

Fig. 3 is a fragmentary enlarged partial vertical section and side elevation showing the manner in which the seat is slidably mounted upon relatively stationary tracks.

Fig. 4 is an under plan view, enlarged, of one of the tracks used, with the accompanying parts joined therewith to accomplish the seat adjustment.

Fig. 5 is a fragmentary transverse vertical section on the plane of line 5—5 of Fig. 3.

Fig. 6 is a fragmentary longitudinal vertical section and side elevation, illustrating the manually operable device for shifting and adjusting the seat.

Fig. 7 is an under plan view of the manually operable adjusting mechanism, and

Fig. 8 is a transverse vertical section substantially on the plane of line 8—8 of Fig. 6, looking in a forward direction.

Like reference characters refer to like parts in the different figures of the drawings.

At the upper side of the bottom 1 of the automobile body directly below where the seat occupied by the driver is to be positioned, suitable tracks are secured in spaced apart and parallel relation to each other. Each of these tracks is made of sheet metal and is of substantially channel form, having an upper horizontal web 2 with downwardly extending vertical spaced flanges 3, which terminate in outturned horizontal attaching flanges 4, resting upon the upper side of the bottom 1 of the body and to which they are permanently secured by screws or other fastening devices passing through the flanges 4.

An inverted channel shaped slide is designed to embrace the upper portion and slide upon each track described. Each slide comprises an upper horizontal web 5 bearing upon the web 2 of its associated track, and downwardly extending flanges 6 which pass at the outer sides of the flanges 3 of the tracks. There are two of these slides which are located in properly spaced apart parallel relation at the underside of the lower member or bottom 7 of the adjustable automobile seat 8.

In order to permit the seat adjustment the upper web 2 of each track has a number of spaced slots 9 cut longitudinally therein. Threaded studs 10 pass first through flat metal plates 11 located under the webs 2 at each slot 9, then pass through the slots 9 and then through openings in the webs 5 of the slides, each stud being provided with a head 12 at its lower end which comes against the underside of its associated plate 11. In practice a flat metal member 13 is permanently secured by welding or other equivalent fastening at the upper side of each web 5 of a slide over each of the slots 9 in a web of the associated track; and the threaded studs 10 are threaded through these members 13 and pass upwardly through openings made in the bottom 7 of the seat. A lock nut 14 with a suitable washer under it is screwed onto the upper projecting end of each stud 10, and each of said studs is also slotted at its upper end, indicated at 15, that the same may be turned by a screwdriver. It is apparent that the upper ends of the studs 10 are all readily accessible by merely moving the seat cushion and that the studs may be adjusted to any desired degree at any time needed for bringing the plates 11 into a proper sliding yet not binding relation against the undersides of the webs 2 of the tracks.

At the front end and at the underside of the bottom 7 of the driver's seat 8, a bracket 16 made of flat metal is secured, having a downwardly extending front lip in which a screw threaded rod 17 is rotatably mounted. The front end of the rod 17 carries an operating handle 18 pivotally connected thereto for manually turning the rod. A fixture is secured to and extends upwardly from the bottom 1 of the automobile body directly back of the bracket 16. This fixture is formed from sheet metal bent to provide two attaching flanges 19 which come together and are then bent upwardly to have contiguous sides 20 riveted together, and formed at its upper portion into a substantially square sleeve 21, in which a nut 22 is secured, the threaded rod 17 passing through said nut. It is obvious that by turning the rod 17 the seat 8 may be moved forward or backward on the tracks depending upon the direction of turning movement imparted to the rod.

The construction described has proved exceptionally practical and serviceable. In the course of use there are frequent changes, thickness, for instance, of the bottom 7 of the seat, caused either by swelling or shrinking of the wood, and if it swells there is liable to be binding of the plates 11 against the underside of the webs 2; and if there is shrinkage there is liable to be too great looseness with consequent rattling and other undesired noises. Also the wear of the parts on each other may in the course of time cause undesirable looseness. All of this can be very simply and easily taken care of by properly adjusting the studs 10 with a screwdriver engageable in the slots 15, so that the plates 11 shall be in proper non-binding and non-rattling association with the webs of the tracks on which the seat is mounted.

The invention is defined in the claims appended hereto and is to be considered comprehensive of all forms of structure coming within their scope.

We claim:

1. In a construction of the class described, spaced apart tracks of substantially channel form each having an upper web and depending spaced apart side flanges, said webs having longitudinal slots therein, bearing plates located against the underside of said webs, one at each slot, a screw threaded stud passing upwardly through each bearing plate and slot, an inverted channel shaped slide through which the studs pass located one over each track, members each having a screw threaded opening therethrough secured to each slide and through each of which a stud passes, a seat through the bottom of which the studs pass located over the slides, and means for connecting the seat with said studs comprising nuts threaded onto the upper ends of said studs above the bottom of the seat.

2. In a construction of the class described, two spaced apart parallel tracks, a slide mounted at the upper side of each track, studs mounted for longitudinal adjustment on the track extending upwardly through said slides, said studs being screw threaded, a seat carried on said tracks through the bottoms of which the studs pass, bearing members between the heads of the studs and said tracks, nuts threaded onto the upper ends of the studs, said studs each having a screwdriver engaging slot at its upper end.

In testimony whereof we affix our signatures.

AUGUST L. NELSON.
FRANK W. PEASE.